US012566790B2

(12) United States Patent
Li et al.

(10) Patent No.: US 12,566,790 B2
(45) Date of Patent: Mar. 3, 2026

(54) LAKEHOUSE METADATA CHANGE DETERMINATION METHOD, DEVICE, AND MEDIUM

(71) Applicant: Beijing Volcano Engine Technology Co., Ltd., Beijing (CN)

(72) Inventors: Mengjun Li, Beijing (CN); Jun Guo, Beijing (CN); Ke Sun, Beijing (CN); Qing Xu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/934,470

(22) Filed: Nov. 1, 2024

(65) Prior Publication Data

US 2025/0156469 A1     May 15, 2025

(30) Foreign Application Priority Data

Nov. 9, 2023    (CN) .......................... 202311490235.9

(51) Int. Cl.
  *G06F 16/383*          (2019.01)
  *G06F 16/23*           (2019.01)
(52) U.S. Cl.
  CPC ........ *G06F 16/383* (2019.01); *G06F 16/2365* (2019.01)
(58) Field of Classification Search
  None
  See application file for complete search history.

(56) References Cited

U.S. PATENT DOCUMENTS 11,222,003 B1     1/2022   Jones et al.
2003/0225913 A1*  12/2003  Bussler ................. G06F 16/258
                                                709/246
(Continued)

FOREIGN PATENT DOCUMENTS

CN        112685433 A      4/2021
CN        113515532 A     10/2021
(Continued)

OTHER PUBLICATIONS

Wen, N. "The Practice of Cloud Native Data Lake Metadata Management in Dipu Technology | Interpretation of Lake Warehouse Integration Technology Series," Zhihu, Jun. 9, 2023, 16 pages.
(Continued)

*Primary Examiner* — Irene Baker
(74) *Attorney, Agent, or Firm* — Alleman Hall LLP

(57) ABSTRACT
The present disclosure discloses a lakehouse metadata change determination method, an electronic device, and a computer-readable medium. The method includes: for a metadata storage system, after receiving a metadata processing request sent by a data engine and used for requesting to perform update processing on a target object, executing object update processing logic corresponding to the metadata processing request, and after it is determined that the object update processing logic is completed, generating an update description message corresponding to the target object according to a comparison result between the target object before updating and the target object after updating, so that the update description message indicates that the update processing on the target object has been performed, and the update description message can be subsequently sent to a message receiving object.

18 Claims, 4 Drawing Sheets

(56)           References Cited

U.S. PATENT DOCUMENTS

| 2009/0006792 | A1* | 1/2009 | Federwisch | G06F 16/10 |
| | | | | 711/162 |
| 2012/0233186 | A1* | 9/2012 | Hammer | G06Q 10/06 |
| | | | | 707/755 |
| 2016/0259821 | A1* | 9/2016 | Rao | G06F 16/2477 |
| 2020/0117680 | A1* | 4/2020 | Bapat | G06F 9/546 |
| 2022/0300478 | A1* | 9/2022 | Scott | G06F 16/2365 |
| 2024/0362219 | A1* | 10/2024 | Kondiles | G06F 16/24537 |

FOREIGN PATENT DOCUMENTS

| CN | 113918584 | A | 1/2022 |
| CN | 114936915 | A | 8/2022 |
| CN | 115470227 | A | 12/2022 |
| CN | 116595096 | A | 8/2023 |
| WO | 2017124976 | A1 | 7/2017 |

OTHER PUBLICATIONS

China National Intellectual Property Administration, Office Action and Search Report Issued in Application No. 202311490235.9, Dec. 3, 2025, 18 pages.

* cited by examiner

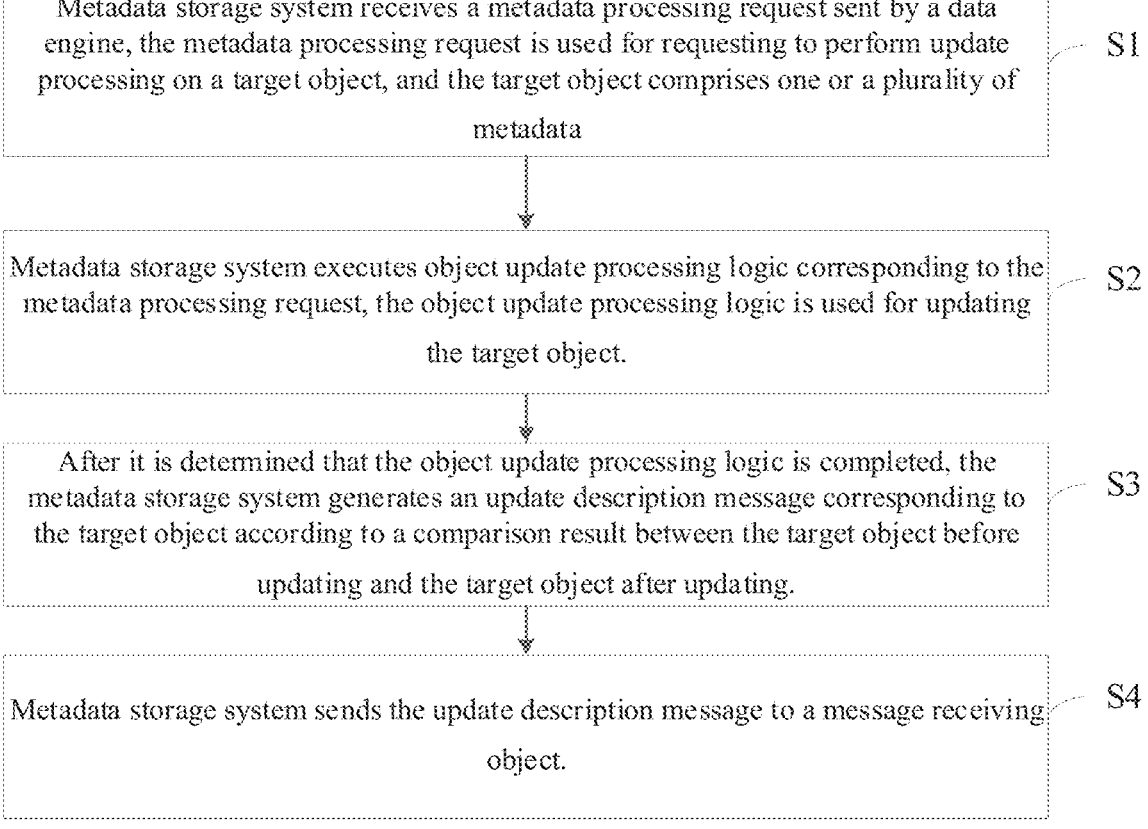

Metadata storage system receives a metadata processing request sent by a data engine, the metadata processing request is used for requesting to perform update processing on a target object, and the target object comprises one or a plurality of metadata    S1

Metadata storage system executes object update processing logic corresponding to the metadata processing request, the object update processing logic is used for updating the target object.    S2

After it is determined that the object update processing logic is completed, the metadata storage system generates an update description message corresponding to the target object according to a comparison result between the target object before updating and the target object after updating.    S3

Metadata storage system sends the update description message to a message receiving object.    S4

Fig. 2

LAKEHOUSE METADATA CHANGE DETERMINATION METHOD, DEVICE, AND MEDIUM

CROSS-CITATION TO RELATED APPLICATIONS

This application claims the priority to and benefits of the Chinese Patent Application, No. 202311490235.9, which was filed on Nov. 9, 2023. The aforementioned patent application is hereby incorporated by citation in its entirety.

TECHNICAL FIELD

The present disclosure relates to the field of computer technologies, and in particular, to a lakehouse metadata change determination method, a device, and a medium.

BACKGROUND

In some application scenarios, a user may need to perform some operations (for example, an adding operation, a deleting operation, a changing operation, or the like) on a database, a table, a partition, or the like under a metadata source (for example, Hive metadata source, or the like), to meet some metadata requirements of the user.

In addition, in some application scenarios, to better reduce impact of these operations on other services, there may be the following requirements: providing a metadata update description message corresponding to these operations to a corresponding service, so that the service learns metadata update caused by these operations, thereby effectively avoiding adverse effects (for example, impacts such as failure to perform a subsequent task in a timely manner, failure to continue query and access to content before updating, or the like) caused by the service not knowing the metadata update.

However, how to implement the foregoing requirements is a technical problem to be solved urgently.

SUMMARY

To solve the above technical problems, the present disclosure provides a lakehouse metadata change determination method and apparatus, a device, and a medium.

To achieve the above object, the technical solutions provided by the present disclosure are as follows.

The present disclosure provides a lakehouse metadata change determination method, which is applied to a metadata storage system, the method comprising:

receiving a metadata processing request sent by a data engine, the metadata processing request is used for requesting to perform update processing on a target object, and the target object comprises one or a plurality of metadata;

executing object update processing logic corresponding to the metadata processing request, the object update processing logic is used for updating the target object;

after it is determined that the object update processing logic is completed, generating an update description message corresponding to the target object according to a comparison result between the target object before updating and the target object after updating; and sending the update description message to a message receiving object.

In a possible implementation, a process of generating the update description message comprises:

if the comparison result indicates that an object identifier of the target object before updating is different from an object identifier of the target object after updating, generating the update description message according to a type of the target object.

In a possible implementation, if the target object is a table object, the generating the update description message according to a type of the target object comprises:

if the type of the target object is a table type, generating the update description message according to a first preset string, semantic information expressed by the first preset string is updating of an object identifier of the table object that belongs to the table type; or if the type of the target object is a view type, generating the update description message according to a second preset string, semantic information expressed by the second preset string is updating of an object identifier of the table object that belongs to the view type.

In a possible implementation, wherein the target object is used for recording a plurality metadata; and a process of generating the update description message comprises:

if the comparison result indicates that a number of data blocks obtained by dividing the target object before updating in a target dimension is the same as a number of data blocks obtained by dividing the target object after updating in the target dimension, and there is a difference in at least one data block between the target object before updating and the target object after updating, generating the update description message according to a number of the at least one data block.

In a possible implementation, wherein the generating the update description message according to a number of the at least one data block comprises:

if the number of the at least one data block is 1, generating the update description message according to a third preset string, semantic information expressed by the third preset string is updating one data block; or if the number of the at least one data block is not less than 2, generating the update description message according to a fourth preset string, semantic information expressed by the fourth preset string is updating a plurality of data blocks.

In a possible implementation, wherein the target object is used for recording a plurality of metadata; and a process of generating the update description message comprises at least one of the following:

if the comparison result indicates that a number of data blocks obtained by dividing the target object after updating in a target dimension is greater than a number of data blocks obtained by dividing the target object before updating in the target dimension, and the data blocks obtained by dividing the target object after updating in the target dimension comprise the data blocks obtained by dividing the target object before updating in the target dimension, generating the update description message according to a fifth preset string, semantic information expressed by the fifth preset string is adding the data block;

if the comparison result indicates that the number of data blocks obtained by dividing the target object before updating in the target dimension is greater than the number of data blocks obtained by dividing the target object after updating in the target dimension, and the data blocks obtained by dividing the target object before updating in the target dimension comprise the data blocks obtained by dividing the target object after updating in the target dimension, generating the update description message according to a sixth preset string, semantic information expressed by the sixth preset string is deleting the data block; or if the comparison result indicates that the number of data blocks obtained by dividing the target object before updating in the target dimension is different from the number of data blocks obtained by dividing the target object after updating in the target dimension, and there is a difference in at least one data block between the target object before updating and the target object after updating, generating the update description message according to a fourth preset string, semantic information expressed by the fourth preset string is updating a plurality of data blocks.

In a possible implementation, wherein the target object is a database object, a table object, or a partition object.

In a possible implementation, wherein the message receiving object is a message middleware or at least one downstream object corresponding to the data engine, and the message middleware is configured to provide the update description message to each downstream object.

In a possible implementation, wherein the generating an update description message corresponding to the target object according to a comparison result between the target object before updating and the target object after updating comprises:

generating the update description message corresponding to the target object according to a preset message format and the comparison result between the target object before updating and the target object after updating, the preset message format is a message format used when the data engine sends a message to the message receiving object.

In a possible implementation, wherein the message receiving object is further configured to receive an object update message generated by the data engine for the metadata processing request; and semantic information carried in the object update message is partially or completely consistent with semantic information carried in the update description message.

In a possible implementation, wherein the metadata processing request is used to describe a plurality of update processing tasks;

the executing object update processing logic corresponding to the metadata processing request comprises:

executing object update processing logic corresponding to each update processing task; and a process of generating the update description message corresponding to the target object comprises:

for any update processing task, after it is determined that the object update processing logic corresponding to the update processing task has been executed, generating an update description message corresponding to the update processing task according to a comparison result between the target object before updating corresponding to the update processing task and the target object after updating corresponding to the update processing task; and generating the update description message corresponding to the target object according to update description messages corresponding to the plurality of update processing tasks.

In a possible implementation, wherein the metadata processing request is generated by the data engine in response to an object update request sent by a client, and the object update request carries client description information; and the generating an update description message corresponding to the target object according to a comparison result between the target object before updating and the target object after updating comprises:

generating the update description message corresponding to the target object according to the client description information provided by the data engine and the comparison result between the target object before updating and the target object after updating.

In a possible implementation, wherein the generating the update description message corresponding to the target object according to the client description information provided by the data engine and the comparison result between the target object before updating and the target object after updating comprises:

generating the update description message corresponding to the target object according to the client description information carried in the metadata processing request and the comparison result between the target object before updating and the target object after updating.

In a possible implementation, wherein before the receiving a metadata processing request sent by a data engine, the method further comprises:

receiving client description information sent by the data engine; and the receiving a metadata processing request sent by a data engine comprises:

receiving the metadata processing request corresponding to the client description information that is sent by the data engine.

In a possible implementation, wherein the after it is determined that the object update processing logic is completed, generating an update description message corresponding to the target object according to a comparison result between the target object before updating and the target object after updating comprises:

after it is determined that the object update processing logic is completed, obtaining logic execution result description information corresponding to the metadata processing request, wherein the logic execution result description information comprises a part of or all information carried in the metadata processing request, the part of or all information comprises object description information of the target object before updating and object description information of the target object after updating, and sending the logic execution result description information to a message generation module embedded in the metadata storage system, so that the message generation module obtains the target object before updating and the target object after updating according to the logic execution result description information, and generates the update description message corresponding to the target object according to the comparison result between the target object before updating and the target object after updating.

The present disclosure provides a lakehouse metadata change determination apparatus, comprising:

a first receiving unit, configured to receive a metadata processing request sent by a data engine, the metadata processing request is used for requesting to perform update processing on a target object, and the target object comprises one or a plurality of metadata;

a logic execution unit, configured to execute object update processing logic corresponding to the metadata processing request, the object update processing logic is used for updating the target object;

a message generation unit, configured to generate an update description message corresponding to the target object according to a comparison result between the target object before updating and the target object after updating after it is determined that the object update processing logic is completed; and a message sending unit, configured to send the update description message to a message receiving object.

The present disclosure provides an electronic device, comprising a processor and a memory;

the memory is configured to store an instruction or a computer program; and the processor is configured to execute the instruction or the computer program in the memory, so that the electronic device performs the lakehouse metadata change determination method provided in the present disclosure.

The present disclosure provides a computer-readable medium, the computer-readable medium stores an instruction or a computer program, and when the instruction or the computer program runs on a device, the device performs the lakehouse metadata change determination method provided in the present disclosure.

The present disclosure provides a computer program product, which comprises a computer program carried on a non-transitory computer-readable medium, wherein the computer program comprises program code for performing the lakehouse metadata change determination method provided in the present disclosure.

BRIEF DESCRIPTION OF DRAWINGS

In order to clearly illustrate the technical solution of the embodiment of the present disclosure or the prior art, the drawings of the embodiments or the prior art will be briefly described in the following; it is obvious that the described drawings are only related to some embodiments of the present disclosure. For an ordinary skilled in the art, other drawings can be obtained according to these drawings without creative work.

In order to more clearly illustrate the technical solutions in the embodiments of the present disclosure or the related art, the following briefly introduces the accompanying drawings required for describing the embodiments or the related art. Apparently, the accompanying drawings in the following description show merely some embodiments of the present disclosure. For an ordinary skilled in the art, other drawings can be obtained according to these drawings without creative work.

FIG. 2 is a flowchart of a lakehouse metadata change determination method according to an embodiment of the present disclosure;

DETAILED DESCRIPTION

Figure 1:
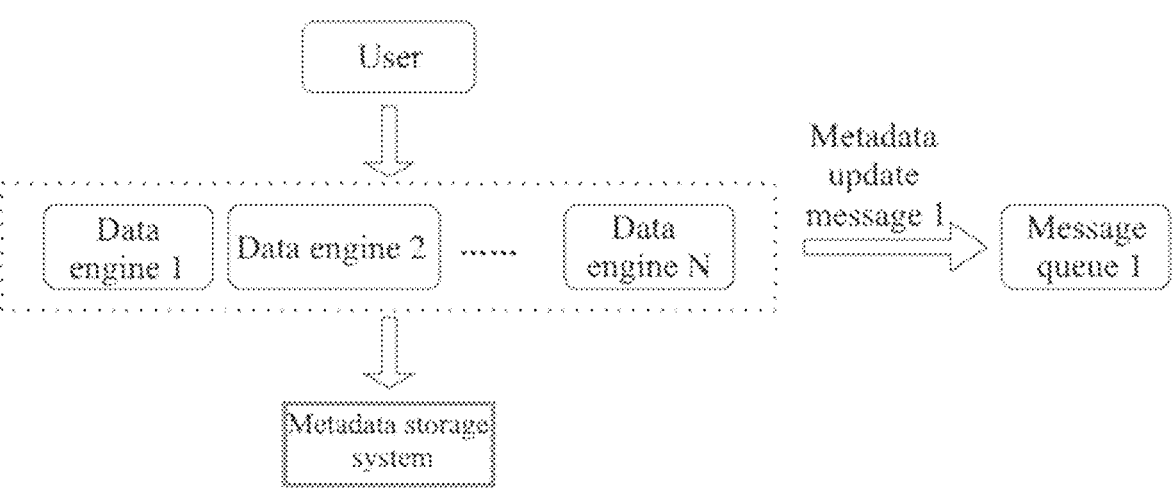
FIG. 1 is a schematic diagram of an update detection solution according to an embodiment of the present disclosure.

It is found through research that for some scenarios (for example, a scenario of metadata update detection in a data lakehouse), some related update detection solutions may specifically be as follows: after a user submits a data update task (for example, a task of changing a table name of a table) through a data engine (for example, a data engine 1, a data engine 2, . . . , or a data engine N shown in FIG. 1), the data engine may call an interface to access a metadata storage system (for example, a system such as Hive Metastore), so that after the data update task is completed by means of the metadata storage system, hook logic configured in the data engine can be entered, so that the data engine can perform metadata update detection through a hook, to obtain an update description message (for example, a metadata update message 1 shown in FIG. 1), and provide the message to a downstream service for use, so as to effectively avoid affecting the downstream service due to missing some update description messages.

It is further found through research that the update detection solution shown in the foregoing paragraph has the following defects: for one metadata storage system, there are more and more data engines connected to the metadata storage system, so that metadata detection logic (for example, the hook logic shown in the foregoing paragraph) needs to be configured in each new connected data engine, so that the data engine can complete metadata update detection for the metadata storage system by means of the logic subsequently, resulting in a relatively large workload in this update detection solution. In addition, if some adjustments (for example, adding some content or changing some content) need to be made to the metadata detection logic, the metadata detection logic in all data engines that have been connected to the metadata storage system needs to be reconfigured, resulting in difficulty in expanding and maintaining this update detection solution.

Based on the foregoing research, to better reduce the difficulty in expanding and maintaining the update detection solution, the present disclosure provides a lakehouse metadata change determination method. The method includes: for a metadata storage system (for example, a metadata storage system such as Hive Metastore), after receiving a metadata processing request sent by a data engine and used for requesting to perform update processing on a target object (for example, a database object, a table object, a partition object, or the like), executing object update processing logic corresponding to the metadata processing request (for example, the object update processing logic is used to update the target object), and after it is determined that the object update processing logic is executed completely, generating an update description message corresponding to the target object according to a comparison result between the target object before updating and the target object after updating, so that the update description message indicates that the update processing on the target object has been performed, and the update description message can be subsequently sent to a message receiving object (for example, some downstream services corresponding to the data engine or the like). In this way, the update description message can be generated by the metadata storage system itself, so that data update detection can be completed by the metadata storage system itself, thereby effectively overcoming the defect caused when data update detection is performed by the data engine, for example, the update detection solution is difficult to expand and maintain because update detection logic needs to be configured for each data engine.

To make those skilled in the art better understand the solutions of the present disclosure, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by those skilled in the art based on the embodiments of the present disclosure without creative efforts shall fall within the protection scope of the present disclosure.

To better understand the technical solutions provided in the present disclosure, the lakehouse metadata change determination method provided in the present disclosure is first described below with reference to some accompanying drawings. As shown in FIG. 2, the lakehouse metadata change determination method provided in this embodiment of the present disclosure includes the following S1 to S4. FIG. 2 is a flowchart of a lakehouse metadata change determination method according to an embodiment of the present disclosure.

In S1, a metadata storage system receives a metadata processing request sent by a data engine, where the metadata processing request is used for requesting to perform update processing on a target object, and the target object comprises one or more metadata.

The metadata storage system refers to a system configured to perform data management (for example, adding new metadata, deleting existing metadata, modifying existing metadata, or the like) for some metadata sources. The implementation of the metadata storage system is not limited in the present disclosure. For example, in some application scenarios (for example, a data lakehouse scenario or the like), the metadata storage system may be implemented by using any metadata storage system (for example, a metadata storage system such as a Hive Metastore), so that the metadata storage system can perform data management for metadata in a data lakehouse. In addition, the implementation of the metadata source is not limited in the present disclosure. For example, the metadata source may be implemented by using any existing or future metadata source (for example, a data lake, a data warehouse, integration of a data lake and a data warehouse, or the like).

Figures 3, 4:
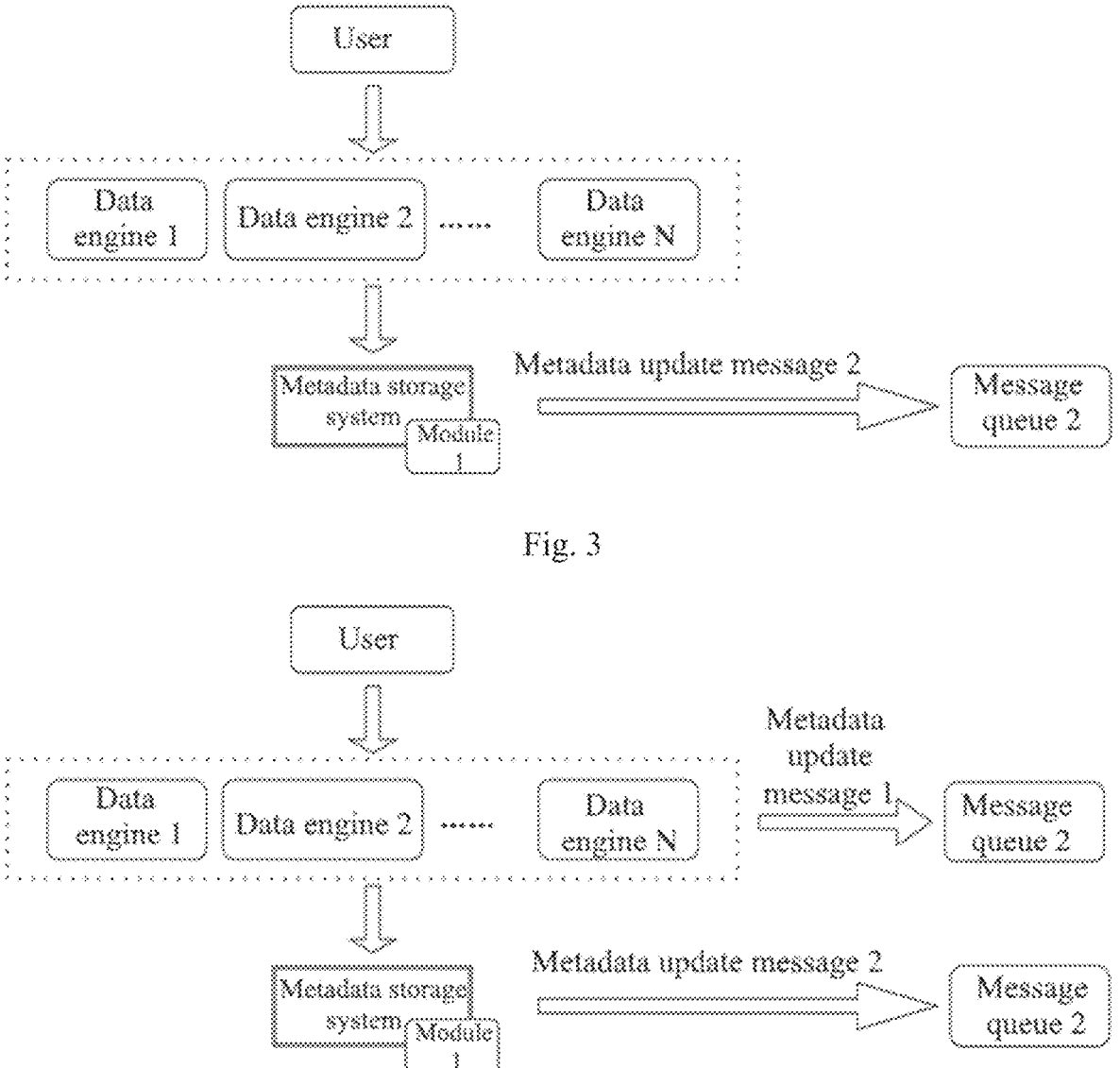
FIG. 3 is a schematic diagram of another update detection solution according to an embodiment of the present disclosure.
FIG. 4 is a schematic diagram of still another update detection solution according to an embodiment of the present disclosure.

It can be learned from the foregoing content that in a possible implementation, the metadata storage system described above may be a metadata storage system (for example, the metadata storage system shown in FIG. 3 or FIG. 4), so that the metadata storage system can be at least used for performing data management on metadata in some metadata sources. The implementation of the metadata storage system is not limited in the present disclosure. For example, the metadata storage system may be implemented by using any existing or future system that can manage metadata, for example, a Hive Metastore, or the like.

The data engine refers to an engine that can implement some data processing processes by means of the metadata storage system described above, so that the data engine is used to represent an upper-layer application of the metadata storage system, and thus the data engine can use the metadata storage system to implement some data processing processes in some ways, for example, interface calling, or the like.

In addition, the implementation of the data engine described above is not limited in the present disclosure. For example, the data engine may be specifically implemented by using any existing or future engine that can be connected to the metadata storage system, for example, a data engine 1, a data engine 2, . . . , or a data engine N shown in FIG. 3 or FIG. 4. For another example, in some application scenarios, the data engine may be implemented as a data analysis engine, a data calculation engine, or a data query engine. It can be seen that in a possible implementation, when the metadata storage system described above is a Hive Metastore, the data engine may be implemented as a Hive-Server2 engine, so that the data engine can access the metadata storage system through interface calling, and thus the metadata storage system can implement some data processing processes by processing a request provided by the data engine.

It should be noted that the implementation of the Hive-Server2 engine in the foregoing paragraph is not limited in the present disclosure. For example, the HiveServer2 engine may include one or more of at least one Structured Query Language (SQL) engine, at least one batch-stream processing engine, and at least one intelligent analysis platform engine.

It should be further noted that the implementation of the SQL engine in the foregoing paragraph is not limited in the present disclosure. For example, the SQL engine may be implemented by using any existing or future SQL engine (for example, an SQL engine such as Hive or Presto). In addition, the implementation of the batch-stream processing engine in the foregoing paragraph is not limited in the present disclosure. For example, the batch-stream processing engine may be implemented by using any existing or future batch-stream processing engine (for example, a batch-stream processing engine such as Spark or Flink). In addition, the implementation of the intelligent analysis platform engine in the foregoing paragraph is not limited in the present disclosure. For example, the intelligent analysis platform engine may be implemented by using any existing or future intelligent analysis platform engine, for example, a Business Intelligence (BI) analysis platform engine.

In addition, for the metadata storage system and the data engine described above, data communication may be performed between the data engine and the metadata storage system. The communication manner of the data communication is not limited in the present disclosure. For example, the data communication may be implemented by using any existing or future manner that can implement communication between the data engine and the metadata storage system. For another example, in some application scenarios, the data engine may access the metadata storage system by calling an interface, so that the metadata storage system can process some metadata processing requests (for example, a request for changing a table name) sent by the data engine through the interface.

The metadata processing request refers to a request sent by the data engine described above to the metadata storage system and used for requesting to perform update processing on a target object (for example, processings such as table name changing, deleting a column of metadata, or adding a new column of metadata). The implementation of the metadata processing request is not limited in the present disclosure. For example, the metadata processing request may be implemented by using any existing or future request sent by the data engine to the metadata storage system and used to request some data processing.

The target object refers to an object processed when the data engine performs a certain update processing by means of the metadata storage system. The target object includes one or more metadata. In addition, the target object is not limited in the present disclosure. For example, in some application scenarios, the target object is a database object, a table object, a partition object, or a data object. The database object includes a large number of table objects. The implementation of the database object is not limited in the present disclosure. For example, the database object may be implemented by using a database including a large number of tables. The table object includes a large amount of metadata. The table object is not limited in the present disclosure. For example, the table object may be implemented by using a table or a view including a large amount of metadata. The data object is used for representing a certain metadata, for example, a certain metadata recorded under a certain table in a certain database).

In addition, the implementation of the data engine obtaining the metadata processing request described above is not limited in the present disclosure. For example, in some application scenarios, if a user can send a request to the data engine by using a client used by the user, a process of the data engine obtaining the metadata processing request may specifically be as follows: generating a metadata processing request in response to an object update request sent by the client, so that the metadata processing request can be subsequently sent to the metadata storage system described above in a specific manner, for example, through interface calling or the like. The client is configured to implement an interaction process with the user, so that the client can be configured to generate a corresponding request (for example, the object update request) in response to some operations triggered by the user, and thus the client can subsequently send the object update request to the data engine. The object update request refers to a request sent by the client to the data engine and used for requesting to perform update processing on a target object. The generation manner of the object update request is not limited in the present disclosure.

It can be learned from the foregoing content that in a possible implementation, when data communication can be performed between the client used by the user and the data engine described above, and data communication can be performed between the data engine and the metadata storage system described above, an interaction process involved in the three parts may specifically be as follows: when detecting a user operation (for example, an operation of the user entering an SQL query statement "alter table test_db.test_tbl rename to test_db.test_tbl_new" or the like), the client may generate an object update request based on the user operation, so that the object update request can indicate a data processing requirement (for example, a requirement such as changing a table name) conveyed by the user through the user operation; the client then sends the object update request to a corresponding data engine (for example, a batch-stream processing engine such as Spark), so that the data engine can generate the metadata processing request based on the object update request, and the metadata processing request can express semantic information carried in the object update request in a format that can be parsed by the metadata storage system; then, the data engine sends the metadata processing request to the metadata storage system in a specific manner (for example, calling an interface alter_table ( ) of Hive Metastore, or the like), so that the metadata storage system can implement the data processing requirement (for example, changing a table name) conveyed by the user operation through processing the metadata processing request.

It should be noted that the association relationship between the object update request and the metadata processing request in the foregoing two paragraphs is not limited in the present disclosure. For example, in some application scenarios, semantic information carried in the object update request is partially or completely consistent with semantic information carried in the metadata processing request. In addition, differences between the object update request and the metadata processing request are not limited in the present disclosure. For example, a request format used by the object update request is different from a request format used by the metadata processing request. The request format used by the object update request refers to a request format that needs to be used when the client communicates with the data engine, so that the data engine can correctly parse the object update request according to the request format. The request format used by the metadata processing request refers to a request format that needs to be used when the data engine communicates with the metadata storage system, so that the metadata storage system can correctly parse the metadata processing request according to the request format.

It can be learned from the related content of S1 described above that, for the metadata storage system described above (for example, the metadata storage system shown in FIG. 3 or FIG. 4 or the like), when data communication can be performed between the metadata storage system and the data engine, the metadata storage system can receive the metadata processing request sent by the data engine, so that the metadata storage system can subsequently process the metadata processing request to perform the update processing on the target object (e.g., a table, etc.), for example, to change a table name, etc.

In S2, the metadata storage system executes object update processing logic corresponding to the metadata processing request, where the object update processing logic is used for updating the target object.

The object update processing logic corresponding to the metadata processing request refers to logic that needs to be executed when the metadata storage system processes the metadata processing request, so that the metadata storage system can implement the update processing on the target object by executing the object update processing logic.

In addition, the implementation of the object update processing logic corresponding to the metadata processing request described above is not limited in the present disclosure. For example, the object update processing logic may refer to logic that is pre-configured for the metadata storage system described above and used to process the metadata processing request.

It can be learned from the related content of S2 described above that for the metadata storage system described above (for example, the metadata storage system shown in FIG. 3 or FIG. 4 or the like), if data communication can be performed between the metadata storage system and the data engine, after receiving a metadata processing request (for example, an alter_table request or the like) sent by the data engine, the metadata storage system may implement a processing process for the metadata processing request by executing object update processing logic corresponding to the metadata processing request, so that after it is determined that the metadata processing request is processed, the metadata storage system can automatically generate an update description message corresponding to the metadata processing request, and the update description message can indicate what update processing is performed on the target object during the process of processing the metadata processing request.

In S3, after it is determined that the object update processing logic is completed, the metadata storage system generates an update description message corresponding to the target object based on a comparison result between the target object before updating and the target object after updating.

The target object before updating refers to the target object before object update processing logic corresponding to the metadata processing request described above is executed. For example, when the metadata processing request is determined based on the foregoing SQL query statement "alter table test_db.test_tbl rename to test_db.test_tbl_new", the target object before updating refers to a table object (for example, an object such as a table or a view) with a table name of test_tbl in a database object with a database name of test_db. It should be noted that the obtaining manner of the target object before updating is not limited in the present disclosure. For example, the obtaining manner may be implemented by using any existing or future method that can obtain a certain object before updating by the metadata storage system.

The target object after updating refers to the target object after object update processing logic corresponding to the metadata processing request described above is executed. For example, when the metadata processing request is determined based on the foregoing SQL query statement "alter table test_db.test_tbl rename to test_db.test_tbl_new", the target object after updating refers to a table object (for example, an object such as a table or a view) with a table name of test_tbl_new in a database object with a database name of test_db. It should be noted that the obtaining manner of the target object after updating is not limited in the present disclosure. For example, the obtaining manner may be implemented by using any existing or future method that can obtain a certain object after updating by the metadata storage system.

In addition, after obtaining the target object before updating and the target object after updating, the metadata storage system may compare the target object before updating with the target object after updating, to obtain a comparison result between the target object before updating and the target object after updating, so that the comparison result can be at least used for indicating a difference between the target object before updating and the target object after updating, for example, a difference such as a different table name or a different data column, and an update description message corresponding to the target object can be subsequently determined based on the comparison result, and thus the update description message can indicate what update processing is performed on the target object when the metadata storage system processes the metadata processing request described above, thereby implementing update detection by the metadata storage system itself.

The update description message corresponding to the target object is used for describing what update processing is performed on the target object when the metadata storage system processes the metadata processing request described above. The implementation of the update description message corresponding to the target object is not limited in the present disclosure. For example, if the target object is a table and related logic of updating a table name of the target object is executed when the metadata storage system processes the metadata processing request, the update description message corresponding to the target object may be determined according to an event of ALTERTABLE_RENAME, so that the update description message can indicate semantic information of "updating the table name of the target object".

In addition, the generation manner of the update description message corresponding to the target object described above is not limited in the present disclosure. For example, in some application scenarios, if the metadata processing request described above can accurately indicate what update processing is performed on the target object, a process of generating the update description message corresponding to the target object may be as follows: the metadata storage system converts the metadata processing request into the update description message corresponding to the target object according to a preset message format, so that the update description message can express semantic information carried in the metadata processing request in the preset message format, the metadata storage system can subsequently send the update description message to a message receiving object, and the message receiving object can correctly parse the message according to the preset message format. The preset message format refers to a message format pre-configured for a communication process between the metadata storage system and the message receiving object, so that the message receiving object can correctly parse a message sent by the metadata storage system. The message receiving object refers to a recipient of the update description message. The implementation of the message receiving object is not limited in the present disclosure. For example, the message receiving object may be a message middleware or at least one downstream object corresponding to the data engine described above. The message middleware is configured to obtain some messages from the metadata storage system and provide the messages to the at least one downstream object corresponding to the data engine, so that the message middleware can act as a message transfer station, thereby effectively avoiding the defect of a relatively large resource overhead caused by directly sending messages to each downstream object by the metadata storage system. The implementation of the message middleware described above is not limited in the present disclosure. For example, the message middleware may be implemented by using any existing or future object (for example, a message queue or the like) that can implement a message transfer function. The downstream object refers to an object (for example, a service or the like) that needs to continue to perform some tasks according to the update description message. The implementation of the downstream object is not limited in the present disclosure. For example, in some application scenarios (for example, a scenario in which data update needs to be displayed to some users in real time), the downstream object may be configured to display the update description message to a corresponding user in a specific manner, so that the users can promptly learn what update occurs in a data source managed by the metadata storage system.

In addition, the implementation of the preset message format in the foregoing paragraph is not limited in the present disclosure. For example, the preset message format may be implemented by using any existing or future message that can implement a communication process between the metadata storage system and the message receiving object.

It is found through research that in some application scenarios, for example, when HiveServer2 can perform update detection, generate and send a corresponding message by means of a Hook in a related solution, a message format sent based on the Hook of the HiveServer2 has become a de facto standard, and downstream services corresponding to the HiveServer2 are connected according to the standard, if a message format has been previously configured for the message receiving object described above, in order to reduce a transformation cost as much as possible, the update description message generated by the metadata storage system described above may follow the message format that has been previously configured for the message receiving object, for example, the message format sent by the Hook.

It can be learned from the foregoing content that in a possible implementation, if a message format required for communicating with the data engine described above has been configured in the message receiving object described above, the preset message format may be implemented by using a message format used when the data engine sends a message to the message receiving object, for example, the message format sent by the Hook, and there is no need to configure a new message format for the message receiving object, so that an update description message can be generated and provided by the metadata storage system without transforming the message receiving object, thereby reducing the transformation cost.

In fact, in some application scenarios, for example, when the metadata storage system described above is Hive Metastore and the data engine described above is an upper-layer application of the Hive Metastore, a metadata processing request received by the metadata storage system may correspond to a plurality of event types, resulting in that the metadata storage system cannot accurately learn, from the metadata processing request, what update processing is specifically performed on a target object. For example, when the metadata processing request is an alter_table request shown in Table 1 below, the metadata processing request may correspond to a plurality of data update operations (for example, an event ALTERTABLE_RENAME of changing a table name, adding a column ALTERTABLE_ADDCOLS, changing a view name ALTERVIEW_RENAME, or the like), resulting in that the metadata storage system can only learn, from the metadata processing request, general content of updating the table object, but cannot accurately learn, from the metadata processing request, what update processing is specifically performed on the table object.

rately indicate what update processing is performed on the target object, thereby facilitating improvement of an update detection effect.

In addition, the implementation of the step "generating an update description message corresponding to the target object according to a comparison result between the target object before updating and the target object after updating" in the foregoing paragraph is not limited in the present disclosure. For example, in some application scenarios, the step may specifically be as follows: the comparison result is converted into the update description message corresponding to the target object according to the preset message format described above, so that the update description message can indicate object update processing conveyed by the comparison result.

In addition, in some application scenarios, to better improve the message generation effect, the present disclosure further provides a possible implementation of the step "generating an update description message corresponding to the target object according to a comparison result between the target object before updating and the target object after updating". In this implementation, a process of generating the update description message may include at least one of the following steps 11 to 15.

Step 11: if the comparison result described above indicates that an object identifier of the target object before updating is different from an object identifier of the target object after updating, the metadata storage system generates the update description message corresponding to the target object according to a type of the target object.

The object identifier of the target object before updating is used for uniquely identifying the target object before updating. The implementation of the object identifier is not limited in the present disclosure. For example, the object identifier may be implemented by using an object name. In a possible implementation, the object identifier of the target object before updating may be an object name of the target object before updating (for example, if the target object before updating is an old table, the object identifier of the target object before updating may be a table name of the old table or the like).

The object identifier of the target object after updating is used for uniquely identifying the target object after updating.

| Request | Definition of Request |
|---|---|
| alter_table request | void alter_table (1:string dbname, 2:string tbl_name, 3:Table new_tbl) throws (1:InvalidOperationException o1,2:MetaException o2) |

Table 1 Request Received by Hive Metastore and a Definition Thereof

For the scenario shown in the foregoing paragraph, to better improve the accuracy of the update description message, the present disclosure further provides a possible implementation of a process of generating the update description message corresponding to the target object described above. In this implementation, if the metadata processing request described above cannot accurately indicate what update processing is performed on the target object by the metadata storage system, the process of generating the update description message corresponding to the target object may specifically be as follows: the update description message corresponding to the target object is generated according to a comparison result between the target object before updating and the target object after updating, so that the update description message can accu- The implementation of the object identifier is not limited in the present disclosure. For example, the object identifier may be implemented by using an object name. In a possible implementation, the object identifier of the target object after updating may be an object name of the target object after updating. for example, if the target object after updating is a new table, the object identifier of the target object after updating may be a table name of the new table or the like.

The type of the target object is used for indicating a type to which the target object belongs. The implementation of the type of the target object is not limited in the present disclosure. For example, when the target object is a table object, if the target object records a plurality of metadata in a Table format, the type of the target object is a table; or if the target object records the plurality of metadata in a View format, the type of the target object is a view.

In addition, the implementation of the step 11 described above is not limited in the present disclosure. For example, when the target object described above is a table object, the step 11 may specifically include the following steps 111 to 112.

Step 111: if the type of the target object described above is a table type and the comparison result described above indicates that the object identifier of the target object before updating is different from the object identifier of the target object after updating, the metadata storage system generates the update description message corresponding to the target object according to a first preset string, where semantic information expressed by the first preset string is updating an object identifier of a table object that belongs to the table type.

The first preset string refers to a preset string used for expressing semantic information of "updating an object identifier of a table object that belongs to the table type". The implementation of the first preset string is not limited in the present disclosure. For example, the first preset string may be ALTERTABLE_RENAME.

In addition, the implementation of step 111 described above is not limited in the present disclosure. For example, in some application scenarios, step 111 may specifically be as follows: directly using the first preset string described above as the update description message corresponding to the target object.

In addition, in some application scenarios, to further improve the message generation effect, the present disclosure further provides a possible implementation of step 111. In this implementation, step 111 may specifically include the following steps 1111 and 1112.

Step 1111: if the type of the target object described above is a table type and the comparison result described above indicates that the object identifier of the target object before updating is different from the object identifier of the target object after updating, the metadata storage system generates an event type corresponding to the target object according to the first preset string.

The event type corresponding to the target object refers to a type of event triggered when the metadata storage system performs update processing on the target object according to object update processing logic corresponding to the metadata processing request described above.

In addition, the implementation of step 1111 described above is not limited in the present disclosure. For example, step 1111 may specifically be as follows: if the type of the target object described above is a table type and the comparison result described above indicates that the object identifier of the target object before updating is different from the object identifier of the target object after updating, using a first preset string (for example, a string ALTERT-ABLE_RENAME) as the event type corresponding to the target object, so that the event type can indicate that an event of changing a table name is triggered when the metadata storage system performs update processing on the target object according to object update processing logic corresponding to the metadata processing request described above.

Step 1112: after obtaining update basic information corresponding to the target object described above, the metadata storage system generates the update description message corresponding to the target object according to the update basic information corresponding to the target object and the event type corresponding to the target object.

The update basic information corresponding to the target object refers to some information that can be directly obtained by the metadata storage system after completing the update processing for the target object, for example, information such as a table name of an old table or a table name of a new table.

In addition, the implementation of the update basic information corresponding to the target object described above is not limited in the present disclosure. For example, the update basic information corresponding to the target object may include object description information of the target object before updating and object description information of the target object after updating. The object description information of the target object before updating is used for describing the target object before updating. The implementation of the object description information of the target object before updating is not limited in the present disclosure. For example, the object description information of the target object before updating may at least include the object identifier of the target object before updating (for example, a table name of the old table or the like). The object description information of the target object after updating is used for describing the target object after updating. The implementation of the object description information of the target object after updating is not limited in the present disclosure. For example, the object description information of the target object after updating may at least include at least one of the object identifier of the target object after updating (for example, a table name of the new table or the like) and the target object after updating (for example, the new table itself). For another example, if the target object is a table object, the update basic information corresponding to the target object may further include a database name corresponding to the target object, so that the database name can indicate a name of a database including the target object.

In addition, the obtaining manner of the update basic information corresponding to the target object described above is not limited in the present disclosure. For example, in some application scenarios, the update basic information corresponding to the target object may be extracted from the metadata processing request described above by the metadata storage system described above. For another example, in some application scenarios, the update basic information corresponding to the target object may refer to logic execution result description information corresponding to the metadata processing request. The logic execution result description information refers to information that is automatically obtained by the metadata storage system after the metadata storage system executes object update processing logic corresponding to the metadata processing request and that is used for describing an execution status of the object update processing logic corresponding to the metadata processing request.

In addition, the implementation of the step 1112 described above is not limited in the present disclosure. For example, the step 1112 may be implemented by using any existing or future method that can automatically combine a plurality of pieces of information into one.

It can be learned from the related content of the steps 1111 to 1112 described above that in some application scenarios, the update description message corresponding to the target object described above may be determined by the metadata storage system described above according to the update basic information corresponding to the target object, the type of the target object, and a comparison result between the target object before updating and the target object after updating, so that the update description message can more accurately indicate what update processing is performed on the target object.

It can be learned from the related content of the step 111 described above that when the target object described above is a table object, if the type of the target object is a table type, it can be determined that the target object is a table for recording a large amount of data. Therefore, when it is determined that an object identifier of the target object before updating (for example, a table name of an old table) is different from an object identifier of the target object after updating (for example, a table name of a new table), it can be determined that the object identifier of the target object is updated. In this case, the update description message corresponding to the target object may be determined according to a first preset string preset in advance (for example, a string ALTERTABLE_RENAME), so that the update description message can indicate object identifier update processing performed on the target object.

Step 112: if the type of the target object described above is a view type and the comparison result described above indicates that the object identifier of the target object before updating is different from the object identifier of the target object after updating, the metadata storage system generates the update description message corresponding to the target object according to a second preset string, where semantic information expressed by the second preset string is updating an object identifier of a table object that belongs to the view type.

The second preset string refers to a preset string used for expressing semantic information of "updating an object identifier of a table object that belongs to the view type". The implementation of the second preset string is not limited in the present disclosure. For example, the second preset string may be ALTERVIEW_RENAME.

In addition, the implementation of the step 112 described above is not limited in the present disclosure. For example, the implementation of the step 112 is similar to that of the step 111 described above. For the sake of brevity, details are not described herein again.

It can be learned from the related content of the step 112 described above that when the target object described above is a table object, if the type of the target object is a view type, it can be determined that the target object is a view used for recording a large quantity of data. Therefore, when it is determined that an object identifier of the target object before updating (for example, a name of an old view) is different from an object identifier of the target object after updating (for example, a name of a new view), it can be determined that the object identifier of the target object is updated. In this case, the update description message corresponding to the target object may be determined according to a second preset string preset in advance (for example, a string ALTERVIEW_RENAME), so that the update description message can indicate object identifier update processing performed on the target object.

It can be learned from the related content of the step 11 described above that in some application scenarios, for the target object described above, when the target object is a table object, because the table object may include a plurality of types of objects (for example, a table and a view), after it is determined that an object identifier of the target object before updating is different from an object identifier of the target object after updating, the update description message corresponding to the target object may be further generated according to the type of the target object, so that the update description message can more accurately indicate what update processing is performed on the target object.

Step 12: if the target object described above is configured to record a plurality of metadata, the comparison result described above indicates that the number of data blocks obtained by dividing the target object before updating in a target dimension is the same as the number of data blocks obtained by dividing the target object after updating in the target dimension, and there is a difference in at least one data block between the target object before updating and the target object after updating, the metadata storage system generates the update description message corresponding to the target object according to the number of data blocks in the at least one data block.

The target dimension refers to a dimension that needs to be used when dividing data blocks for the target object described above. The implementation of the target dimension is not limited in the present disclosure. For example, if the target object is a database object, the target dimension may be a table dimension, a database partition dimension, or the like. If the target object is a table object, the target dimension may be a column dimension, a table partition dimension, or the like. If the target object is a partition object, the target dimension may be a column dimension or the like.

In addition, the implementation of the step 12 described above is not limited in the present disclosure. For example, the step 12 may specifically be as follows: if the target object described above is configured to record a plurality of metadata, the comparison result described above indicates that the number of data blocks obtained by dividing the target object before updating in a target dimension is the same as the number of data blocks obtained by dividing the target object after updating in the target dimension, and there is a difference in at least one data block between the target object before updating and the target object after updating, generating the update description message corresponding to the target object according to the number of data blocks in the at least one data block, so that the update description message carries the number of data blocks in the at least one data block.

For another example, in some application scenarios, to better improve the message generation effect, the step 12 may specifically include the following steps 121 and 122.

Step 121: if the target object described above is configured to record a plurality of metadata, the comparison result described above indicates that the number of data blocks obtained by dividing the target object before updating in a target dimension is the same as the number of data blocks obtained by dividing the target object after updating in the target dimension, there is a difference in at least one data block between the target object before updating and the target object after updating, and the number of data blocks in the at least one data block is 1, generating the update description message corresponding to the target object according to a third preset string, where semantic information expressed by the third preset string is updating one data block.

The third preset string refers to a preset string used for expressing semantic information of "updating one data block". The implementation of the third preset string is not limited in the present disclosure. For example, the third preset string may be ALTERTABLE_RENAMECOL.

In addition, the implementation of the step 121 described above is not limited in the present disclosure. For example, the implementation of step the 121 is similar to that of the step 111 described above. For the sake of brevity, details are not described herein again.

It can be learned from the related content of the step 121 described above that in some application scenarios, when the target object described above is a table and the target dimension is a column dimension, if the comparison result described above indicates that the number of data blocks obtained by dividing the table before updating in the column dimension (that is, the number of data columns in the table before updating) is the same as the number of data blocks obtained by dividing the table after updating in the column dimension (that is, the number of data columns in the table after updating), and there is only one different data column between the table before updating and the table after updating, the update description message corresponding to the target object may be generated according to a third preset string (for example, a string ALTERTABLE_RENAME-COL), so that the update description message can indicate update processing performed on some data column in the target object, for example, processing such as changing a column name or updating some or all data in the data column.

Step 122: if the target object described above is configured to record a plurality of metadata, the comparison result described above indicates that the number of data blocks obtained by dividing the target object before updating in a target dimension is the same as the number of data blocks obtained by dividing the target object after updating in the target dimension, there is a difference in at least one data block between the target object before updating and the target object after updating, and the number of data blocks in the at least one data block is not less than 2, generating the update description message corresponding to the target object according to a fourth preset string, where semantic information expressed by the fourth preset string is updating the plurality of data blocks.

The fourth preset string refers to a preset string used for expressing semantic information of "updating the plurality of data blocks". The implementation of the fourth preset string is not limited in the present disclosure. For example, the fourth preset string may be ALTERTABLE_RE-PLACECOLS.

In addition, the implementation of the step 122 described above is not limited in the present disclosure. For example, the implementation of the step 122 is similar to that of the step 111 described above. For the sake of brevity, details are not described herein again.

It can be learned from the related content of the step 122 described above that in some application scenarios, when the target object described above is a table and the target dimension is a column dimension, if the comparison result described above indicates that the number of data blocks obtained by dividing the table before updating in the column dimension (that is, the number of data columns in the table before updating) is the same as the number of data blocks obtained by dividing the table after updating in the column dimension (that is, the number of data columns in the table after updating), and there are a plurality of different data columns between the table before updating and the table after updating, the update description message corresponding to the target object may be generated according to a fourth preset string (for example, a string ALTERT-ABLE_REPLACECOLS), so that the update description message can indicate update processing performed on some data columns in the target object, for example, processing such as changing a column name or updating some or all data in the data column.

It can be learned from the related content of the step 12 described above that in some application scenarios, for the target object described above, when the target object is a table and the target dimension is a column dimension, if the number of data columns in the table before updating is the same as the number of data columns in the table after updating, the update description message corresponding to the target object may be generated based on the number of different data columns between the table before updating and the table after updating, so that the update description message can more accurately indicate what update processing is performed on the target object.

Step 13: if the target object described above is configured to record a plurality of metadata, the comparison result described above indicates that the number of data blocks obtained by dividing the target object after updating in a target dimension is greater than the number of data blocks obtained by dividing the target object before updating in the target dimension, and the data blocks obtained by dividing the target object after updating in the target dimension include the data blocks obtained by dividing the target object before updating in the target dimension, generating the update description message corresponding to the target object according to a fifth preset string, where semantic information expressed by the fifth preset string is adding data blocks.

The fifth preset string refers to a preset string used for expressing semantic information of "adding data blocks". The implementation of the fifth preset string is not limited in the present disclosure. For example, the fifth preset string may be ALTERTABLE_ADDCOLS.

In addition, the implementation of the step 13 described above is not limited in the present disclosure. For example, the implementation of the step 13 is similar to that of the step 111 described above. For the sake of brevity, details are not described herein again.

It can be learned from the related content of the step 13 described above that in some application scenarios, when the target object described above is a table and the target dimension is a column dimension, if the comparison result described above indicates that the number of data columns in the table after updating is greater than the number of data columns in the table before updating, and the data columns in the table after updating include the data columns in the table before updating, it can be determined that the table after updating has added some data columns relative to the table before updating. Therefore, the update description message corresponding to the target object may be generated according to a fifth preset string, so that the update description message can indicate that some data columns are added to the target object.

Step 14: if the target object described above is configured to record a plurality of metadata, the comparison result described above indicates that the number of data blocks obtained by dividing the target object before updating in a target dimension is greater than the number of data blocks obtained by dividing the target object after updating in the target dimension, and the data blocks obtained by dividing the target object before updating in the target dimension include the data blocks obtained by dividing the target object after updating in the target dimension, generating the update description message corresponding to the target object according to a sixth preset string, where semantic information expressed by the sixth preset string is deleting data blocks.

The sixth preset string refers to a preset string used for expressing semantic information of "deleting data blocks". The implementation of the sixth preset string is not limited in the present disclosure. For example, the sixth preset string may be ALTERTABLE_DELCOLS.

In addition, the implementation of the step 14 described above is not limited in the present disclosure. For example, the implementation of the step 14 is similar to that of the step 111 described above. For the sake of brevity, details are not described herein again.

It can be learned from the related content of the step 14 described above that in some application scenarios, when the target object described above is a table and the target dimension is a column dimension, if the comparison result described above indicates that the number of data columns in the table before updating is greater than the number of data columns in the table after updating, and the data columns in the table before updating include the data columns in the table after updating, it can be determined that the table after updating has deleted some data columns relative to the table before updating. Therefore, the update description message corresponding to the target object may be generated according to a sixth preset string, so that the update description message can indicate that some data columns are deleted from the target object.

Step 15: if the target object described above is configured to record a plurality of metadata, the comparison result described above indicates that the number of data blocks obtained by dividing the target object before updating in a target dimension is different from the number of data blocks obtained by dividing the target object after updating in the target dimension, and there is a difference in at least one data block between the target object before updating and the target object after updating, generating the update description message corresponding to the target object according to a fourth preset string, where semantic information expressed by the fourth preset string is updating the plurality of data blocks.

In the present disclosure, in some application scenarios, when the target object described above is a table and the target dimension is a column dimension, if the comparison result described above indicates that the number of data columns in the table before updating is different from the number of data columns in the table after updating, and some data columns in the table after updating are different from some data columns in the table before updating, the update description message corresponding to the target object may be generated according to a fourth preset string, so that the update description message can indicate that update processing is performed on some data columns in the target object. It should be noted that related content of the fourth preset string may refer to related content of the fourth preset string in step 122 described above.

It can be learned from the related content of steps 11 to 15 described above that in some application scenarios, for the target object described above, after the metadata storage system completes update processing for the target object, the target object before updating and the target object after updating may be first obtained; and then the update description message corresponding to the target object is generated according to a comparison result between the target object before updating and the target object after updating, so that the update description message can more accurately indicate what update processing is performed on the target object.

It can be learned from the related content of the update description message corresponding to the target object described above that in a possible implementation, a process of generating the update description message corresponding to the target object may specifically be as follows: the update description message corresponding to the target object is generated according to a preset message format and a comparison result between the target object before updating and the target object after updating, so that the update description message can indicate, in the preset message format, what update processing is performed on the target object. The preset message format is a message format used when the data engine sends a message to the message receiving object, so that the message receiving object can continue to use a previous message parsing manner, thereby reducing a transformation cost.

It can be learned from the related content of S3 described above that for the metadata storage system described above, after it is determined that object update processing logic corresponding to the metadata processing request described above is completed, the metadata storage system may generate the update description message corresponding to the target object according to a comparison result between the target object before updating and the target object after updating, so that the update description message can indicate that update processing on the target object has been performed, so that the update description message can be subsequently provided to a corresponding service (for example, some downstream services corresponding to the data engine or the like).

S4: the metadata storage system sends the update description message to the message receiving object.

Related content of the message receiving object may refer to the foregoing description. For the sake of brevity, details are not described herein again.

It can be seen that for the metadata storage system described above, after receiving the metadata processing request sent by the data engine and used for requesting to perform update processing on the target object, the metadata storage system not only needs to process the request and generate the update description message corresponding to the target object, but also needs to provide the update description message to at least one downstream object corresponding to the data engine in a specific manner, so that the downstream objects can obtain the update description messages in a timely manner, thereby effectively avoiding adverse effects caused by the downstream objects missing some messages.

It can be learned from the related content of S1 to S4 described above that for a metadata storage system (for example, a metadata storage system such as Hive Metastore), after receiving the metadata processing request sent by the data engine and used for requesting to perform update processing on a target object (for example, a database object, a table object, a partition object, or the like), object update processing logic (for example, the object update processing logic used for updating the target object) corresponding to the metadata processing request is executed, so that after it is determined that the object update processing logic is completed, an update description message corresponding to the target object is generated according to a comparison result between the target object before updating and the target object after updating, the update description message can indicate that update processing on the target object has been performed, and the update description message can be subsequently sent to the message receiving object (for example, some downstream services corresponding to the data engine or the like), and thus the metadata storage system can generate the update description message, thereby implementing data update detection by the metadata storage system itself, and effectively overcoming the defect caused when the data engine performs data update detection, for example, the defect that the update detection solution is difficult to expand and maintain because corresponding update detection logic needs to be configured for each data engine.

It is found through research that for some application scenarios, in a metadata storage system (for example, a metadata storage system such as Hive Metastore), some permissions may be configured for some data engines (for example, an engine such as Spark) by means of some manners (for example, a whitelist or the like), so that after the data engines complete an authentication and authorization process for a user, authorization processing for the user can be directly skipped in the metadata storage system, the data engines usually do not provide related information of the user to the metadata storage system, and further the metadata storage system can only perceive related information of the data engines but cannot perceive related information of the user who triggers the entire data update process, and thus the update description message provided by the metadata storage system cannot carry user-related information, resulting in that the downstream service cannot learn who triggers the data update process, thereby affecting the data update detection effect.

Based on the research described in the foregoing paragraph, to better improve the update detection effect, a communication process between the metadata storage system and the data engine may be further transformed, so that the metadata storage system can smoothly obtain the user information from the data engine. Based on this, the present disclosure further provides a possible implementation of S3 described above. In this implementation, when the metadata processing request described above is generated by the data engine in response to an object update request sent by a client and the object update request carries client description information, S3 may specifically be as follows: the update description message corresponding to the target object is generated according to the client description information provided by the data engine and a comparison result between the target object before updating and the target object after updating, so that the update description message carries the client description information, the update description message can not only indicate what update processing is performed on the target object, but also indicate who triggers the update processing, and thus a subsequent downstream object can obtain more comprehensive information from the update description message.

The client description information refers to information used for describing a trigger of an update process described by the metadata processing request described above.

In addition, the implementation of the client description information described above is not limited in the present disclosure. For example, in some application scenarios, when the metadata processing request described above is generated by the data engine in response to an object update request sent by a client, the client description information may include a user identifier corresponding to the client. The user identifier is used for uniquely identifying a user of the client. The implementation of the user identifier is not limited in the present disclosure. For example, the user identifier may be at least one of a login account on the client and a client identifier of the client. The client identifier is used for uniquely identifying the client.

In addition, the manner in which the data engine described above obtains the client description information is not limited in the present disclosure. For example, when the metadata processing request described above is generated by the data engine in response to an object update request sent by a client and the object update request carries client description information, the data engine may directly extract the client description information from the object update request.

In addition, the manner in which the data engine described above provides the client description information to the metadata storage system is not limited in the present disclosure. For ease of understanding, the following provides two examples for description.

Example 1: In some application scenarios, the data engine described above may stuff the client description information described above into a specific idle field in the metadata processing request described above, so that the metadata processing request carries the client description information, the data engine can subsequently provide the client description information to the metadata storage system by means of a sending process of the metadata processing request, thereby effectively improving the communication efficiency between the data engine and the metadata storage system, facilitating improvement of data update efficiency, and effectively shortening the response time to the user request.

It can be learned from the foregoing content that in some application scenarios, when the metadata processing request described above carries the client description information, S3 described above may specifically be as follows: the update description message corresponding to the target object is generated according to the client description information carried in the metadata processing request and a comparison result between the target object before updating and the target object after updating, so that the update description message carries the client description information. In this way, the data engine can provide as much information as possible to the metadata storage system through a data communication process, thereby facilitating improvement of the efficiency.

Example 2: In some application scenarios, to reduce a transformation cost as much as possible, a data communication process between the data engine and the metadata storage system may be implemented by means of secondary communication, so that the metadata storage system can send the client description information and the metadata processing request described above to the data engine twice, thereby effectively avoiding cost overheads caused by transforming a data communication protocol between the data engine and the metadata storage system (that is, a protocol that needs to be used for sending the metadata processing request), thereby facilitating reduction of the transformation cost.

Based on Example 2 described above, the present disclosure further provides a possible implementation of the lakehouse metadata change determination method described above. In this implementation, the lakehouse metadata change determination method may at least include the following steps 21 to 24.

Step 21: the metadata storage system receives the client description information sent by the data engine.

In the present disclosure, for the data engine described above and the metadata storage system described above, after receiving an object update request triggered by a user through a client, the data engine may obtain the client description information from the object update request, so that the client description information can indicate related information of the user; and then the data engine sends the client description information to the metadata storage system, and thus the metadata storage system can subsequently generate the update description message by using the client description information.

Step 22: the metadata storage system receives the metadata processing request corresponding to the client description information described above, which is sent by the data engine.

It should be noted that related content of the step 22 described above may refer to related content of S1 described above.

Step 23: the metadata storage system executes object update processing logic corresponding to the metadata processing request, where the object update processing logic is used for updating a target object.

It should be noted that related content of the step 23 described above may refer to related content of S2 described above.

Step 24: after it is determined that the object update processing logic is completed, the metadata storage system generates the update description message corresponding to the target object according to a comparison result between the target object before updating and the target object after updating.

It should be noted that related content of the step 24 described above may refer to related content of S3 described above.

It can be learned from the related content of the steps 21 to 24 described above that in some application scenarios, for a data engine and a metadata storage system that can perform data communication, after receiving an object update request triggered by a user through a client, the data engine may obtain the client description information from the object update request, so that the client description information can indicate related information of the user; and then, the data engine sends the client description information to the metadata storage system, so that after it is determined that the metadata storage system receives the client description information, the data engine continues to send the metadata processing request generated according to the object update request to the metadata storage system, the metadata storage system can process the metadata processing request, and after it is determined that the metadata processing request is processed, the metadata storage system generates the update description message corresponding to the target object according to the client description information and a comparison result between the target object before updating and the target object after updating, the update description message can not only indicate what update processing is performed on the target object, but also indicate who triggers the update processing, and thus a subsequent downstream object can obtain more comprehensive information from the update description message, thereby implementing providing as much information as possible to the downstream object by the metadata storage system on the premise of minimizing the transformation cost.

It is found through research that in some application scenarios, the metadata processing request described above (for example, a request for requesting to create a plurality of partitions or the like) may need to trigger a plurality of tasks (for example, accessing the metadata storage system by calling an analysis creation interface multiple times), so that the metadata processing request corresponds to a plurality of update processes. Therefore, to better improve the message generation effect, the present disclosure further provides a possible implementation of the lakehouse metadata change determination method described above. In this implementation, the lakehouse metadata change determination method may at least include the following steps 31 to 34.

Step 31: the metadata storage system receives a metadata processing request sent by a data engine, where the metadata processing request is used for requesting to perform update processing on a target object, and the metadata processing request is used for describing a plurality of update processing tasks.

One update processing task is used for indicating to perform one update processing on the target object. For example, when the metadata processing request described above is used for indicating to add N partitions, the metadata processing request may be used for describing N partition adding tasks, so that the metadata storage system needs to execute partition adding logic N times to complete a processing for the metadata processing request. Wherein, N is a positive integer.

Step 32: the metadata storage system executes object update processing logic corresponding to each update processing task.

In the present disclosure, for any update processing task (for example, an nth partition adding task), after receiving the update processing task, the metadata storage system may execute object update processing logic (for example, partition adding logic) corresponding to the update processing task, so that the metadata storage system can complete processing for the update processing task by means of the object update processing logic. Wherein, n is a positive integer, and $n \leq N$.

It should be noted that the implementation of the metadata storage system obtaining the plurality of update processing tasks described above is not limited in the present disclosure. For example, for some application scenarios, after a data engine generates a metadata processing request, if the metadata processing request is used for describing N update processing tasks, the data engine may access the metadata storage system by calling an interface N times, so that the metadata storage system can complete an update processing task involved in each access. It can be seen that when the data engine accesses the metadata storage system by calling the interface for the nth time, the metadata storage system is used for completing an nth update processing task. Wherein, n is a positive integer, and n_N.

Step 33: for any update processing task, after it is determined that the object update processing logic corresponding to the update processing task is completed, the metadata storage system generates an update description message corresponding to the update processing task according to a comparison result between a target object before updating corresponding to the update processing task and a target object after updating corresponding to the update processing task.

In the present disclosure, for an nth update processing task, after obtaining the nth update processing task, the metadata storage system executes object update processing logic corresponding to the nth update processing task, so that after determining that the object update processing logic corresponding to the nth update processing task is completed, the metadata storage system generates an update description message corresponding to the nth update processing task according to a comparison result between a target object before updating corresponding to the nth update processing task and a target object after updating corresponding to the nth update processing task, so that the update description message can indicate what update processing has the metadata storage system completed for the target object by processing the nth update processing task. The target object before updating corresponding to the nth update processing task refers to a target object before the metadata storage system processes the nth update processing task. The target object after updating corresponding to the nth update processing task refers to a target object obtained after the metadata storage system processes the nth update processing task. The update description message corresponding to the nth update processing task refers to an update description message generated after the metadata storage system processes the nth update processing task. Wherein, n is a positive integer, and n&N.

Step 34: the metadata storage system generates the update description message corresponding to the target object according to update description messages corresponding to the plurality of update processing tasks.

In the present disclosure, after obtaining update description messages corresponding to all the update processing tasks (for example, an update description message corresponding to an nth update processing task is ADD_PARTI-TION, n is a positive integer, and n_N), the metadata storage system may generate the update description message corresponding to the target object (for example, ALTERTABLE_DROPPARTS) according to the update description messages corresponding to the update processing tasks, so that the update description message corresponding to the target object can indicate what update processing the metadata storage system performs on the target object in a process for processing the metadata processing request described above.

It can be learned from the related content of the steps 31 to 34 described above that in some application scenarios, for the data engine and the metadata storage system described above, if the data engine generates a metadata processing request used for describing a plurality of update processing tasks, from a perspective of the data engine, the metadata processing request is a request, but from a perspective of the metadata storage system, the metadata processing request is composed of a plurality of task requests, and the metadata storage system needs to execute a plurality of processing logics to complete the metadata processing request, so that the metadata storage system generates a plurality of update description messages in a completion process for the metadata processing request. Therefore, the update description messages may be combined into one message, so that the message and the metadata processing request can form a one-to-one correspondence, and thus the message can more accurately indicate what update processing the metadata storage system performs on the target object in the processing process for the metadata processing request described above, thereby effectively avoiding user confusion caused by one metadata processing request corresponding to a plurality of messages, and facilitating improvement of the update detection effect.

In fact, in some application scenarios, to better avoid message omission, the present disclosure further provides a backup mechanism. The backup mechanism may specifically be as follows: for the message receiving object described above, the message receiving object may not only be configured to receive the update description message corresponding to the target object that is generated by the metadata storage system described above, but also be configured to receive an object update message generated by the data engine described above for the metadata processing request described above. Semantic information carried in the object update message is partially or completely consistent with semantic information carried in the update description message, so that the message receiving object can receive two messages for describing update processing of the target object, thereby better avoiding the message omission defect caused by the metadata storage system being unable to generate or send the update description message, and better ensuring that the downstream object better performs a corresponding service. The object update message refers to a message generated by the data engine for the metadata processing request and used for indicating that update processing on the target object has been performed. The implementation of the object update message is not limited in the present disclosure. For example, the object update message may be a message obtained by the data engine by means of Hook logic configured internally, so that the object update message can indicate what update processing is performed on the target object.

It should be noted that for the update description message described above and the object update message described above, the two messages have a same format, and semantic information carried in the two messages is similar (or even the two messages are completely the same), but generators of the two messages are different. The former is generated by the metadata storage system described above, and the latter is generated by the data engine described above.

It should be further noted that the implementation of the message receiving object described above is not limited in the present disclosure. For example, in a possible implementation, the message receiving object may be implemented by using a plurality of message queues (for example, a message queue 1 and a message queue 2 shown in FIG. 3), so that different message queues are configured to record messages sent by different devices, so that a subsequent downstream object can separately obtain messages provided by different devices from the different message queues.

It can be learned from the backup mechanism shown above that the present disclosure further provides an update detection solution. In the solution, not only does the metadata storage system need to perform update detection on the target object to obtain and send the update description message corresponding to the target object (for example, a metadata update message 2 shown in FIG. 3), but also the data engine needs to perform update detection on the target object by means of Hook logic that is already configured in the data engine, to obtain and send an object update message corresponding to the target object (for example, a metadata update message 1 shown in FIG. 3), so that some downstream objects corresponding to the data engine can obtain the two messages, thereby effectively avoiding the message omission defect caused by the metadata storage system being unable to generate or send the update description message, and better ensuring that the downstream object better performs a corresponding service.

In fact, in some application scenarios, to better save the transformation cost, the update detection processing may be completed by adding a new module (for example, a Listen interface having an update detection function) to the metadata storage system described above. Based on this, the present disclosure further provides a possible implementation of the lakehouse metadata change determination method described above. In this implementation, when the metadata storage system is embedded with a message generation module, the lakehouse metadata change determination method may at least include the following steps 51 and 52.

Step 51: after it is determined that the object update processing logic is completed, the metadata storage system obtains logic execution result description information corresponding to the metadata processing request, where the logic execution result description information includes some or all of information carried in the metadata processing request described above, and the some or all of information includes object description information of the target object before updating and object description information of the target object after updating.

The logic execution result description information corresponding to the metadata processing request is used for indicating an execution status of the object update processing logic corresponding to the metadata processing request.

In addition, the implementation of the logic execution result description information corresponding to the metadata processing request described above is not limited in the present disclosure. For example, in some application scenarios, the logic execution result description information may at least include some or all of information carried in the metadata processing request, so that the logic execution result description information can at least express some semantic information described by the metadata processing request.

It can be seen that in a possible implementation, when the metadata processing request described above carries at least the object description information of the target object before updating and the object description information of the target object after updating, the logic execution result description information corresponding to the metadata processing request may also include at least the object description information of the target object before updating and the object description information of the target object after updating, so that the logic execution result description information can indicate what the target object before updating is and what the target object after updating is. For related content of the object description information of the target object before updating and the object description information of the target object after updating, it may refer to the foregoing description. For the sake of brevity, details are not described herein again.

Step 52: the metadata storage system sends the logic execution result description information described above to a message generation module embedded in the metadata storage system, so that the message generation module obtains the target object before updating and the target object after updating according to the logic execution result description information, and generates the update description message corresponding to the target object according to a comparison result between the target object before updating and the target object after updating.

The message generation module refers to a module (for example, a module 1 shown in FIG. 3 or FIG. 4) that is pre-configured in the metadata storage system described above and used for generating update description information. The implementation of the message generation module is not limited in the present disclosure. For example, the message generation module may be implemented by using any existing or future module. In addition, in some application scenarios, to reduce a transformation cost as much as possible, the message generation module may be implemented by using a preset interface (for example, a Listen interface), so that the metadata storage system can implement embedding the message generation module in the metadata storage system only by adding one interface.

In addition, the working principle of the message generation module described above is not limited in the present disclosure. For example, the working principle may specifically be as follows: after obtaining the logic execution result description information described above, the message generation module may obtain the target object before updating (for example, obtaining an old table based on a dbname and a tbl_name) and the target object after updating according to the logic execution result description information, and generate the update description message corresponding to the target object according to a comparison result between the target object before updating and the target object after updating.

It can be learned from the related content of the steps 51 to 52 described above that in some application scenarios, for the metadata storage system described above, the purpose of generating the update description message corresponding to the target object inside the metadata storage system may be implemented by adding one interface (for example, a Listen interface) to the metadata storage system, thereby reducing the transformation cost as much as possible while implementing data update detection within the metadata storage system.

Figure 5:
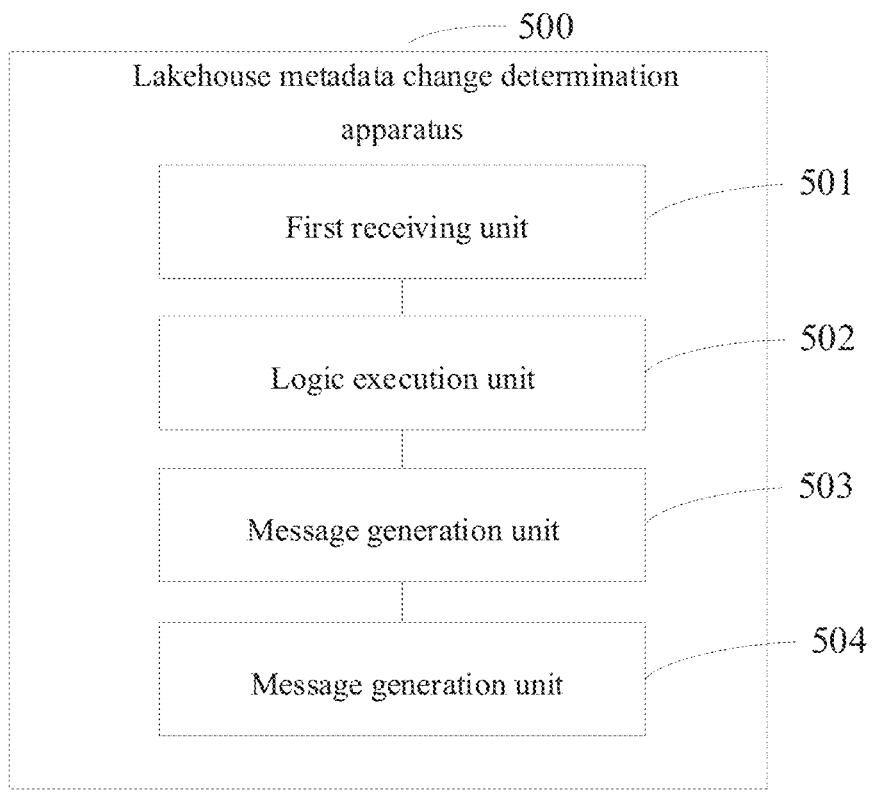
FIG. 5 is a schematic diagram of a structure of a lakehouse metadata change determination apparatus according to an embodiment of the present disclosure.

Based on the lakehouse metadata change determination method provided in this embodiment of the present disclosure, this embodiment of the present disclosure further provides a lakehouse metadata change determination apparatus. The following provides explanations with reference to FIG. 5. FIG. 5 is a schematic structural diagram of a lakehouse metadata change determination apparatus according to an embodiment of the present disclosure. It should be noted that for technical details of the lakehouse metadata change determination apparatus provided in this embodiment of the present disclosure, it may refer to related content of the lakehouse metadata change determination method described above.

As shown in FIG. 5, a lakehouse metadata change determination apparatus 500 provided in this embodiment of the present disclosure includes:

a first receiving unit 501, configured to receive a metadata processing request sent by a data engine, the metadata processing request is used for requesting to perform update processing on a target object;

a logic execution unit 502, configured to execute object update processing logic corresponding to the metadata processing request, where the object update processing logic is used for updating the target object;

a message generation unit 503, configured to generate an update description message corresponding to the target object according to a comparison result between a target object before updating and a target object after updating, after it is determined that the object update processing logic is completed; and a message sending unit 504, configured to send the update description message to a message receiving object.

In a possible implementation, the message generation unit 503 includes:

a first generation subunit, configured to generate the update description message according to a type of the target object, if the comparison result indicates that an object identifier of the target object before updating is different from an object identifier of the target object after updating.

In a possible implementation, if the target object is a table object, the first generation subunit is specifically configured to: if the type of the target object is a table type, generate the update description message according to a first preset string, semantic information expressed by the first preset string is updating an object identifier of a table object that belongs to the table type; or if the type of the target object is a view type, generate the update description message according to a second preset string, semantic information expressed by the second preset string is updating an object identifier of a table object that belongs to the view type.

In a possible implementation, the target object is configured to record a plurality of metadata;

the message generation unit 503 includes:

a second generation subunit, configured to: if the comparison result indicates that a number of data blocks obtained by dividing the target object before updating in a target dimension is the same as a number of data blocks obtained by dividing the target object after updating in the target dimension and there is a difference in at least one data block between the target object before updating and the target object after updating, generate the update description message according to a number of data blocks in the at least one data block.

In a possible implementation, the second generation subunit is specifically configured to: if the number of data blocks in the at least one data block is 1, generate the update description message according to a third preset string, semantic information expressed by the third preset string is updating one data block; or if the number of data blocks in the at least one data block is not less than 2, generate the update description message according to a fourth preset string, semantic information expressed by the fourth preset string is updating the plurality of data blocks.

In a possible implementation, the target object is configured to record a plurality of metadata;

the message generation unit 503 includes at least one of a third generation subunit, a fourth generation subunit, and a fifth generation subunit:

the third generation subunit is configured to generate the update description message according to a fifth preset string if the comparison result indicates that the number of data blocks obtained by dividing the target object after updating in a target dimension is greater than the number of data blocks obtained by dividing the target object before updating in the target dimension, and the data blocks obtained by dividing the target object after updating in the target dimension include the data blocks obtained by dividing the target object before updating in the target dimension, semantic information expressed by the fifth preset string is adding the data blocks;

the fourth generation subunit is configured to generate the update description message according to a sixth preset string if the comparison result indicates that the number of data blocks obtained by dividing the target object before updating in a target dimension is greater than the number of data blocks obtained by dividing the target object after updating in the target dimension, and the data blocks obtained by dividing the target object before updating in the target dimension include the data blocks obtained by dividing the target object after updating in the target dimension, semantic information expressed by the sixth preset string is deleting the data blocks;

the fifth generation subunit is configured to generate the update description message according to a fourth preset string if the comparison result indicates that the number of data blocks obtained by dividing the target object before updating in a target dimension is different from the number of data blocks obtained by dividing the target object after updating in the target dimension, and there is a difference in at least one data block between the target object before updating and the target object after updating, semantic information expressed by the fourth preset string is updating the plurality of data blocks.

In a possible implementation, the target object is a database object, a table object, or a partition object.

In a possible implementation, the message receiving object is a message middleware or at least one downstream object corresponding to the data engine, and the message middleware is configured to provide the update description message to each downstream object.

In a possible implementation, the message generation unit 503 is specifically configured to: generate the update description message corresponding to the target object according to a preset message format and the comparison result between the target object before updating and the target object after updating, the preset message format is a message format used when the data engine sends a message to the message receiving object.

In a possible implementation, the message receiving object is further configured to receive an object update message generated by the data engine for the metadata processing request; and semantic information carried in the object update message is partially or completely consistent with semantic information carried in the update description message.

In a possible implementation, the metadata processing request is used for describing a plurality of update processing tasks;

the logic execution unit 502 is specifically configured to: execute object update processing logic corresponding to each update processing task; and the message generation unit 503 is specifically configured to: for any update processing task, generate an update description message corresponding to the update processing task according to the comparison result between a target object before updating corresponding to the update processing task and a target object after updating corresponding to the update processing task, after it is determined that the object update processing logic corresponding to the update processing task is completed; and generate the update description message corresponding to the target object according to update description messages corresponding to the plurality of update processing tasks.

In a possible implementation, the metadata processing request is generated by the data engine in response to an object update request sent by a client, and the object update request carries client description information;

the message generation unit 503 is specifically configured to: generate the update description message corresponding to the target object according to the client description information provided by the data engine and the comparison result between the target object before updating and the target object after updating.

In a possible implementation, the message generation unit 503 is specifically configured to: generate the update description message corresponding to the target object according to the client description information carried in the metadata processing request and the comparison result between the target object before updating and the target object after updating.

In a possible implementation, the lakehouse metadata change determination apparatus 500 further includes:

a second receiving unit, configured to receive the client description information sent by the data engine; and the first receiving unit 501 is specifically configured to: receive a metadata processing request corresponding to the client description information sent by the data engine.

In a possible implementation, the message generation unit 503 is specifically configured to: obtain logic execution result description information corresponding to the metadata processing request after it is determined that the object update processing logic is completed, the logic execution result description information includes some or all of information carried in the metadata processing request described above, and the some or all of information includes object description information of the target object before updating and object description information of the target object after updating; and send the logic execution result description information to a message generation module embedded in the metadata storage system, so that the message generation module obtains the target object before updating and the target object after updating according to the logic execution result description information, and generates the update description message corresponding to the target object according to the comparison result between the target object before updating and the target object after updating.

It can be learned from the related content of the lakehouse metadata change determination apparatus 500 described above that for the lakehouse metadata change determination apparatus 500 provided in this embodiment of the present disclosure, the lakehouse metadata change determination apparatus 500 is configured to implement some or all of functions in a metadata storage system (for example, a metadata storage system such as Hive Metastore or the like). A working principle of the lakehouse metadata change determination apparatus 500 is as follows: after receiving the metadata processing request sent by the data engine and used for requesting to perform update processing on a target object (for example, a database object, a table object, a partition object, or the like), object update processing logic (for example, the object update processing logic used for updating the target object) corresponding to the metadata processing request is executed, so that after it is determined that the object update processing logic is completed, an update description message corresponding to the target object is generated according to the comparison result between the target object before updating and the target object after updating, the update description message can indicate that update processing on the target object has been performed, the update description message can be subsequently sent to the message receiving object (for example, some downstream services corresponding to the data engine or the like), and thus the metadata storage system can generate the update description message, thereby implementing data update detection by the metadata storage system itself, effectively overcoming the defect caused when another device (for example, the data engine) performs data update detection, for example, the defect that the update detection solution is difficult to expand and maintain because related update detection logic needs to be configured for each data engine.

In addition, an embodiment of the present disclosure further provides an electronic device. The device includes a processor and a memory. The memory is configured to store an instruction or a computer program. The processor is configured to execute the instruction or the computer program in the memory, so that the electronic device executes any implementation of the lakehouse metadata change determination method provided in the embodiment of the present disclosure.

Figure 6:
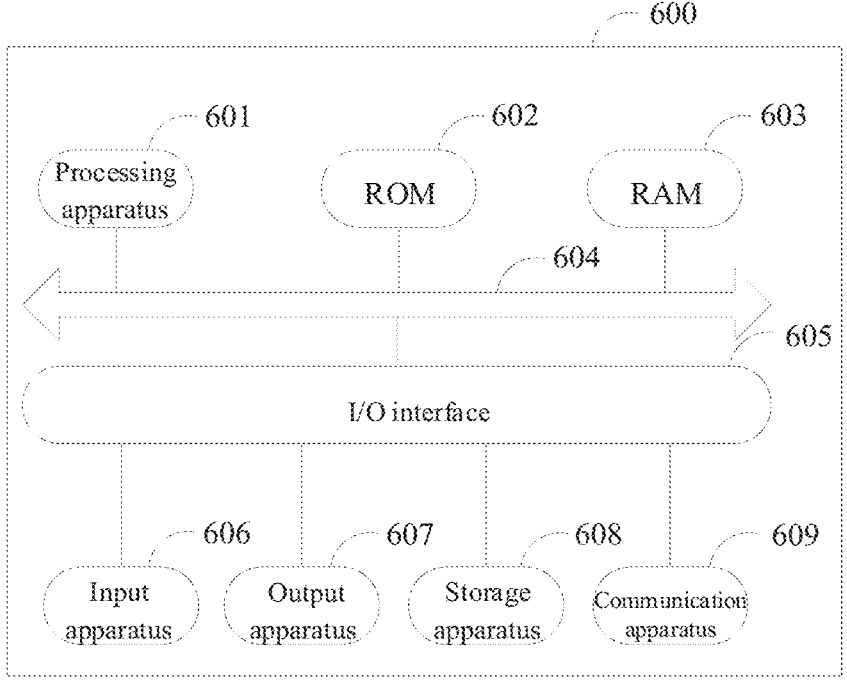
FIG. 6 is a schematic diagram of a structure of an electronic device according to an embodiment of the present disclosure.

FIG. 6 is a schematic diagram of a structure of an electronic device 600 suitable for implementing an embodiment of the present disclosure. The terminal device in this embodiment of the present disclosure may include, but is not limited to, a mobile terminal such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and a fixed terminal such as a digital TV and a desktop computer or the like. The electronic device shown in FIG. 6 is merely an example, and shall not impose any limitation on the functions and the range of use of the embodiments of the present disclosure.

As shown in FIG. 6, the electronic device 600 may include a processing apparatus (for example, a central processing unit, a graphics processing unit, or the like) 601 that may perform various suitable actions and processing in accordance with a program stored in a read-only memory (ROM) 602 or a program loaded from a storage apparatus 608 into a random access memory (RAM) 603. The RAM 603 further stores various programs and data required for the operation of the electronic device 600. The processing apparatus 601, the ROM 602, and the RAM 603 are connected to each other through a bus 604. An input/output (I/O) interface 605 is also connected to the bus 604.

Usually, the following apparatus may be connected to the I/O interface 605: an input apparatus 606 including, for example, a touch screen, a touchpad, a keyboard, a mouse, a camera, a microphone, an accelerometer, and a gyroscope, or the like; an output apparatus 607 including, for example, a liquid crystal display (LCD), a loudspeaker, a vibrator, or the like; the storage apparatus 608 including, for example, a tape and a hard disk, or the like; and a communication apparatus 609. The communication apparatus 609 may allow the electronic device 600 to be in wireless or wired communication with other devices to exchange data. Although FIG. 6 shows the electronic device 600 having various apparatuses, it should be understood that not all of the illustrated apparatuses are necessarily implemented or included. More or fewer apparatuses may be implemented or included alternatively.

In particular, according to an embodiment of the present disclosure, the process described above with reference to the flowcharts may be implemented as a computer software program. For example, some embodiments of the present disclosure includes a computer program product, which includes a computer program carried by a non-transitory computer-readable medium. The computer program includes program code for performing the method shown in the flowcharts. In such embodiments, the computer program may be downloaded online through the communication apparatus 609 and installed, may be installed from the storage apparatus 608, or may be installed from the ROM 602. When the computer program is executed by the processing apparatus 601, the above-mentioned functions defined in the methods of some embodiments of the present disclosure are performed.

The electronic device provided in this embodiment of the present disclosure and the method provided in the foregoing embodiment belong to the same inventive concept. For technical details that are not described in detail in this embodiment, reference may be made to the foregoing embodiment, and this embodiment and the foregoing embodiment have the same beneficial effects.

An embodiment of the present disclosure further provides a computer-readable medium, instructions or a computer program is stored in the computer-readable medium, and when the instructions or the computer program runs on a device, the device is enabled to execute any implementation of the lakehouse metadata change determination method provided in the embodiment of the present disclosure.

It should be noted that the above-mentioned computer-readable medium in the present disclosure may be a computer-readable signal medium, a computer-readable storage medium, or any combination thereof. For example, the computer-readable storage medium may be, but not limited to, an electric, magnetic, optical, electromagnetic, infrared, or semiconductor system, apparatus, or device, or any combination thereof. More specific examples of the computer-readable storage medium may include, but is not limited to: an electrical connection with one or more wires, a portable computer magnetic disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or in combination with an instruction execution system, apparatus, or device. In the present disclosure, the computer-readable signal medium may include a data signal propagated in a baseband or as a part of a carrier and carriers the computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate, or transmit a program used by or in combination with an instruction execution system, apparatus, or device. Program code contained in the computer-readable medium may be transmitted by any suitable medium, including but not limited to: electric wires, fiber-optic cables, radio frequency (RF), or the like, or any appropriate combination thereof.

In some implementations, the client and the server may communicate with any network protocol known or to be researched and developed in the future such as a hypertext transfer protocol (HTTP), and may be communicate (via a communication network) and interconnect with digital data in any form or medium. Examples of the communication network include a local area network ("LAN"), a wide area network ("WAN"), an internetwork (for example, the Internet), and an end-to-end network (for example, an ad hoc end-to-end network), as well as any network currently known or to be researched and developed in the future.

The foregoing computer-readable medium may be included in the foregoing electronic device; or may also exist alone without being assembled into the electronic device.

The foregoing computer-readable medium carries one or more programs, and when the one or more programs are executed by the electronic device, the electronic device can execute the foregoing method.

The computer program code for performing the operations of the present disclosure may be written in one or more programming languages or a combination thereof. The above-mentioned programming languages include, but are not limited to, an object-oriented programming language, such as Java, Smalltalk, and C++, and further include conventional procedural programming languages, such as "C" programming language or similar programming languages. The program code may be executed entirely on a computer of a user, partially executed on a computer of a user, executed as a stand-alone software package, partially executed on a computer of a user and partially executed on a remote computer, or entirely executed on a remote computer or server. In the scenario related to the remote computer, the remote computer may be connected to the computer of the user through any type of network, including a local area network (LAN) or a wide area network (WAN), or may be connected to an external computer (for example, connected over the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, program segment, or part of code, including one or more executable instructions for implementing the specified logical functions. It should also be noted that in some alternative implementations, the functions noted in the blocks may also occur out of the order noted in the accompanying drawings. For example, two blocks shown in succession can actually be performed substantially concurrently, or they can sometimes be performed in the reverse order, depending upon the functionality involved. It should also be noted that each block in the block diagrams and/or the flowcharts, and a combination of the blocks in the block diagrams and/or the flowcharts may be implemented by a dedicated hardware-based system that performs specified functions or operations, or may be implemented by a combination of dedicated hardware and computer instructions.

The related units described in the embodiments of the present disclosure may be implemented by means of software, or may be implemented by means of hardware. Among them, the name of the unit/module does not constitute a limitation on the unit itself under certain circumstances.

The functions described herein above may be performed at least partially by one or more hardware logic components. For example, without limitation, available exemplary types of hardware logic components include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may include or store a program for used by or in combination with an instruction execution system, apparatus, or device. The machine-readable medium may be a machine-readable signal medium or a machine-readable storage medium. The machine-readable medium may include, but is not limited to, an electronical, magnetic, optical, electromagnetic, infrared, or semi-conductive system, apparatus, or device, or any suitable combination thereof. More specific examples of the machine-readable storage medium may include an electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof.

It should be noted that in the present specification, the embodiments are described in a progressive manner, and each embodiment focuses on differences from other embodiments. The same or similar parts between the embodiments may be referred to each other. For a system or apparatus disclosed in an embodiment, since it corresponds to a method disclosed in the embodiment, the description is relatively simple, and for related parts, reference may be made to the description of the method section.

It should be understood that in the present disclosure, "at least one item" means one or more items, and "a plurality of items" mean two or more items. "And/or" is used to describe an association relationship between associated objects, and represents that three relationships may exist. For example, "A and/or B" may represent the following three cases: only A exists, only B exists, and both A and B exist, where A and B may be singular or plural. The character "/" generally indicates an "or" relationship between the associated objects. "At least one of the following items (at least one of the following)" or a similar expression thereof means any combination of these items, including a single item (singular) or any combination of a plurality of items (plural). For example, at least one of a, b, or c may represent: a, b, c, "a and b", "a and c", "b and c", or "a, b, and c", where a, b, and c may be singular or plural.

It should be further noted that in this document, relational terms such as first and second are merely used to distinguish one entity or operation from another entity or operation, and do not necessarily require or imply any actual relationship or order between these entities or operations. Moreover, the term "include", "comprise" or any other variant thereof is intended to cover non-exclusive inclusion, so that a process, method, product, or apparatus that includes a list of elements includes not only those elements, but also other elements not explicitly listed, or further includes elements inherent to such a process, method, product, or apparatus. Without more restrictions, an element defined by the statement "include a/an . . . " does not exclude the existence of another identical element in the process, method, product, or apparatus that includes the element.

The steps of the method or algorithm described in connection with the embodiments disclosed herein may be directly implemented by hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium well known in the art.

The foregoing descriptions of the disclosed embodiments enable those skilled in the art to implement or use the present disclosure. Various modifications to these embodiments are obvious to those skilled in the art, and the general principles defined herein may be implemented in other embodiments without departing from the spirit or scope of the present disclosure. Therefore, the present disclosure is not limited to the embodiments shown herein, but is to comply with the widest scope consistent with the principles and novel features disclosed herein.

The invention claimed is:

1. An object change determination method for a metadata source of a lakehouse, wherein the method is applied to and performed by a metadata storage system, the method comprising:

receiving a metadata processing request sent by a data engine, the metadata processing request is used for requesting to perform update processing on a target object located in the metadata source of the lakehouse, and the target object comprises one or a plurality of metadata, wherein the metadata storage system is configured to perform data management for the metadata source, the update processing comprising one or more of changes to metadata included in the target object or an object identifier of the target object;

executing object update processing logic corresponding to the metadata processing request, the object update processing logic is used for updating the target object;

after it is determined that the object update processing logic is completed, obtaining logic execution result description information corresponding to the metadata processing request, wherein the logic execution result description information comprises a part of or all information carried in the metadata processing request, the part of or all information comprises object description information of the retrieved historical version of the target object before updating and object description information of the target object after updating;

sending the logic execution result description information to a message generation module embedded in the metadata storage system, so that the message generation module obtains the retrieved historical version of the target object before updating and the target object after updating according to the logic execution result description information;

generating an update description message corresponding to the target object according to a comparison result between a retrieved historical version of the target object before updating and the target object after updating, wherein the comparison result is used at least for indicating a difference between the retrieved historical version of the target object before updating and the target object after updating, the difference comprises a difference between metadata included in the retrieved historical version of the target object before updating and metadata included in the target object after updating, or a difference between an object identifier of the retrieved historical version of the target object before updating and an object identifier of the target object after updating, and wherein the target object is a database object, a table object, or a partition object; and sending the update description message to a message receiving object.

2. The method according to claim 1, wherein the generating the update description message comprises:

if the comparison result indicates that the object identifier of the retrieved historical version of the target object before updating is different from the object identifier of the target object after updating, generating the update description message according to a type of the target object.

3. The method according to claim 2, wherein if the target object is a table object, the generating the update description message according to a type of the target object comprises:

if the type of the target object is a table type, generating the update description message according to a first preset string, semantic information expressed by the first preset string is updating of an object identifier of the table object that belongs to the table type; or if the type of the target object is a view type, generating the update description message according to a second preset string, semantic information expressed by the second preset string is updating of an object identifier of the table object that belongs to the view type.

4. The method according to claim 1, wherein the target object is used for recording a plurality metadata; and the generating the update description message comprises:

if the comparison result indicates that a number of data blocks obtained by dividing the retrieved historical version of the target object before updating in a target dimension is the same as a number of data blocks obtained by dividing the target object after updating in the target dimension, and there is a difference in at least one data block between the retrieved historical version of the target object before updating and the target object after updating, generating the update description message according to a number of the at least one data block.

5. The method according to claim 4, wherein the generating the update description message according to a number of the at least one data block comprises:

if the number of the at least one data block is 1, generating the update description message according to a third preset string, semantic information expressed by the third preset string is updating one data block; or if the number of the at least one data block is not less than 2, generating the update description message according to a fourth preset string, semantic information expressed by the fourth preset string is updating a plurality of data blocks.

6. The method according to claim 1, wherein the target object is used for recording a plurality of metadata; and the generating the update description message comprises at least one of the following:

if the comparison result indicates that a number of data blocks obtained by dividing the target object after updating in a target dimension is greater than a number of data blocks obtained by dividing the retrieved historical version of the target object before updating in the target dimension, and the data blocks obtained by dividing the target object after updating in the target dimension comprise the data blocks obtained by dividing the retrieved historical version of the target object before updating in the target dimension, generating the update description message according to a fifth preset string, semantic information expressed by the fifth preset string is adding the data block;

if the comparison result indicates that the number of data blocks obtained by dividing the retrieved historical version of the target object before updating in the target dimension is greater than the number of data blocks obtained by dividing the target object after updating in the target dimension, and the data blocks obtained by dividing the retrieved historical version of the target object before updating in the target dimension comprise the data blocks obtained by dividing the target object after updating in the target dimension, generating the update description message according to a sixth preset string, semantic information expressed by the sixth preset string is deleting the data block; or if the comparison result indicates that the number of data blocks obtained by dividing the retrieved historical version of the target object before updating in the target dimension is different from the number of data blocks obtained by dividing the target object after updating in the target dimension, and there is a difference in at least one data block between the retrieved historical version of the target object before updating and the target object after updating, generating the update description message according to a fourth preset string, semantic information expressed by the fourth preset string is updating a plurality of data blocks.

7. The method according to claim 1, wherein the message receiving object is a message middleware or at least one downstream object corresponding to the data engine, and the message middleware is configured to provide the update description message to each downstream object.

8. The method according to claim 1, wherein the generating the update description message corresponding to the target object according to a comparison result between the retrieved historical version of the target object before updating and the target object after updating comprises:

generating the update description message corresponding to the target object according to a preset message format and the comparison result between the retrieved historical version of the target object before updating and the target object after updating, the preset message format is a message format used when the data engine sends a message to the message receiving object.

9. The method according to claim 1, wherein the message receiving object is further configured to receive an object update message generated by the data engine for the metadata processing request; and semantic information carried in the object update message is partially or completely consistent with semantic information carried in the update description message.

10. The method according to claim 1, wherein the metadata processing request is used to describe a plurality of update processing tasks;

the executing object update processing logic corresponding to the metadata processing request comprises:

executing object update processing logic corresponding to each update processing task; and the generating the update description message corresponding to the target object comprises:

for any update processing task, after it is determined that the object update processing logic corresponding to the update processing task has been executed, generating an update description message corresponding to the update processing task according to a comparison result between the retrieved historical version of the target object before updating corresponding to the update processing task and the target object after updating corresponding to the update processing task; and generating the update description message corresponding to the target object according to update description messages corresponding to the plurality of update processing tasks.

11. The method according to claim 1, wherein the metadata processing request is generated by the data engine in response to an object update request sent by a client, and the object update request carries client description information; and the generating the update description message corresponding to the target object according to a comparison result between the retrieved historical version of the target object before updating and the target object after updating comprises:

generating the update description message corresponding to the target object according to the client description information provided by the data engine and the comparison result between the retrieved historical version of the target object before updating and the target object after updating.

12. The method according to claim 11, wherein the generating the update description message corresponding to the target object according to the client description information provided by the data engine and the comparison result between the retrieved historical version of the target object before updating and the target object after updating comprises:

generating the update description message corresponding to the target object according to the client description information carried in the metadata processing request and the comparison result between the retrieved historical version of the target object before updating and the target object after updating.

13. The method according to claim 11, wherein before the receiving a metadata processing request sent by a data engine, the method further comprises:

receiving the client description information sent by the data engine; and wherein, the receiving a metadata processing request sent by a data engine comprises:

receiving the metadata processing request corresponding to the client description information that is sent by the data engine.

14. An electronic device, comprising a processor and a memory;

the memory is configured to store an instruction or a computer program; and the processor is configured to execute the instruction or the computer program in the memory, so that the electronic device performs the method according to claim 1.

15. A computer-readable medium, the computer-readable medium stores an instruction or a computer program, and when the instruction or the computer program runs on a device, the device performs the method according to claim 1.

16. The electronic device according to claim 14, wherein the generating the update description message comprises:

if the comparison result indicates that an object identifier of the retrieved historical version of the target object before updating is different from an object identifier of the target object after updating, generating the update description message according to a type of the target object.

17. The electronic device according to claim 14, wherein the target object is used for recording a plurality metadata; and the generating the update description message comprises:

if the comparison result indicates that a number of data blocks obtained by dividing the retrieved historical version of the target object before updating in a target dimension is the same as a number of data blocks obtained by dividing the target object after updating in the target dimension, and there is a difference in at least one data block between the retrieved historical version of the target object before updating and the target object after updating, generating the update description message according to a number of the at least one data block.

18. The electronic device according to claim 14, wherein the target object is used for recording a plurality of metadata; and the generating the update description message comprises at least one of the following:

if the comparison result indicates that a number of data blocks obtained by dividing the target object after updating in a target dimension is greater than a number of data blocks obtained by dividing the retrieved historical version of the target object before updating in the target dimension, and the data blocks obtained by dividing the target object after updating in the target dimension comprise the data blocks obtained by dividing the retrieved historical version of the target object before updating in the target dimension, generating the update description message according to a fifth preset string, semantic information expressed by the fifth preset string is adding the data block;

if the comparison result indicates that the number of data blocks obtained by dividing the retrieved historical version of the target object before updating in the target dimension is greater than the number of data blocks obtained by dividing the target object after updating in the target dimension, and the data blocks obtained by dividing the retrieved historical version of the target object before updating in the target dimension comprise the data blocks obtained by dividing the target object after updating in the target dimension, generating the update description message according to a sixth preset string, semantic information expressed by the sixth preset string is deleting the data block; or if the comparison result indicates that the number of data blocks obtained by dividing the retrieved historical version of the target object before updating in the target dimension is different from the number of data blocks obtained by dividing the target object after updating in the target dimension, and there is a difference in at least one data block between the retrieved historical version of the target object before updating and the target object after updating, generating the update description message according to a fourth preset string, semantic information expressed by the fourth preset string is updating a plurality of data blocks.

* * * * *